Jan. 22, 1946. D. C. HUNGERFORD ET AL 2,393,323
THREADED FASTENING DEVICE
Filed June 16, 1944
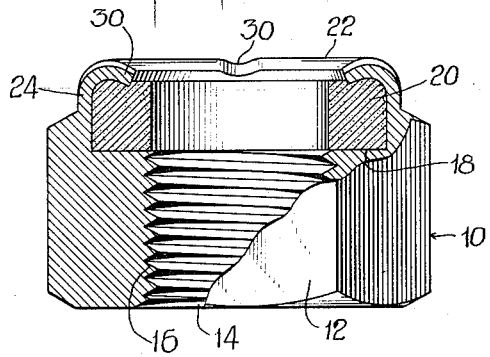
Fig. 1.
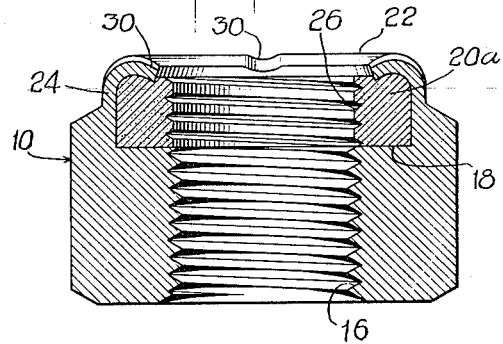
Fig. 2.
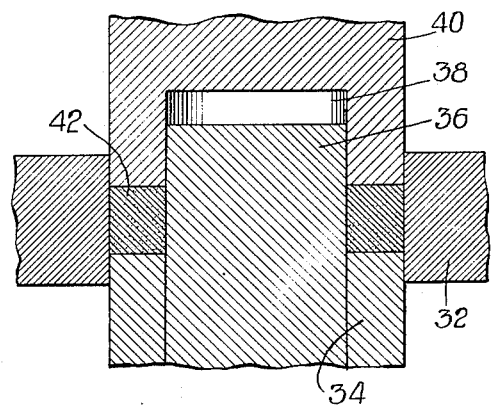
Fig. 3.
Fig. 4.
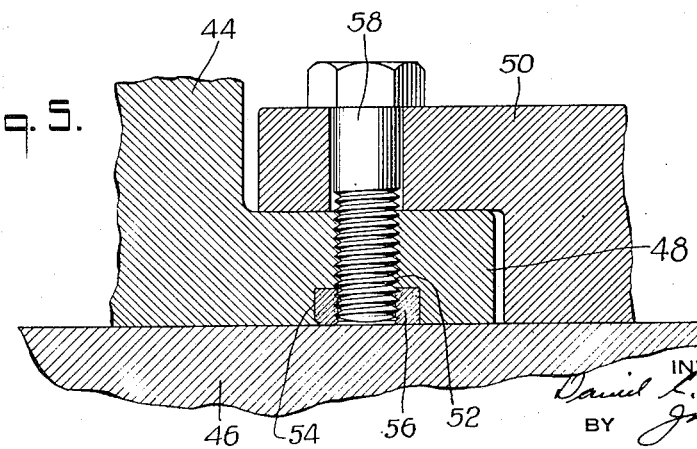
Fig. 5.
INVENTORS
Daniel L. Hungerford
John D. Shaw
Jarvis C. Marsh
BY
ATTORNEY Patented Jan. 22, 1946

2,393,323

UNITED STATES PATENT OFFICE 2,393,323

THREADED FASTENING DEVICE

Daniel C. Hungerford, Madison, and John D. Shaw, Totowa, N. J., assignors, by mesne assignments, to Elastic Stop Nut Corporation of America, Union, N. J., a corporation of New Jersey Application June 16, 1944, Serial No. 540,638

19 Claims. (Cl. 10—86)

The present invention relates to threaded fastening devices and has particular reference to self-locking devices of the kind in which two threaded elements such as a bolt and a nut are held against undesired relative turning movement by pressure engagement, specifically gripping engagement, between the threads of the cooperating elements. The invention is particularly applicable to the production of self-locking nuts and will hereinafter be explained and discussed in connection with the production of such articles, but it is to be understood that in its broader aspects the invention is not limited to self-locking nuts.

Self-locking nuts of the kind in which the bolt thread is grippingly engaged by an insert of elastic material fixed in the body of the nut and in which a thread is impressed by the bolt thread, have for some years been employed with a high degree of success. Heretofore, however, such nuts have been limited in their use to relatively low temperature applications since the only materials heretofore found satisfactory have been of a non-metallic nature incapable of withstanding high temperatures without deteriorating to a degree rendering the material ineffective. In order to overcome this deficiency and to produce an all-metal nut capable of withstanding relatively higher temperature it has previously been suggested that the insert be made of soft metal such as lead or alloys thereof in which a thread might be impressed by a bolt. Such materials have proved to be useless for the intended purpose since a degree of elasticity is required in the insert material which is not possessed by metals soft enough to have threads impressed in them without injury to the bolt threads making the impression.

It is accordingly the general object of the present invention to provide a novel form of self-locking threaded fastening device, in particular a self-locking nut, of all metal construction in which a metal insert is provided which is capable of having a thread impressed in it by an ordinary bolt thread without injury to the latter and which at the same time possesses sufficient elasticity to provide the gripping action on the bolt thread required to effect the desired locking function.

In order to attain this and other and more detailed objects of the invention which will hereinafter appear, the invention contemplates the use of an insert of porous elastic metal which in its preferred form consists of powdered metal compacted and sintered. We have discovered that when relatively elastic metals, including the ferrous metals such as iron and steel, and also brass, bronze, copper, etc., are reduced to powdered form and then compacted and sintered, the relatively porous nature of the material due to the voids in the mass produced by the compacting and sintering of a powder permits such displacement of the metal as to enable a thread to be impressed by a bolt thread without injury to the latter while at the same time, due to the elasticity of the metal, retaining the elastic gripping action required to provide the self-locking function. We therefore propose to make use of such material in accordance with the present invention, as hereinafter more fully explained in the ensuing portion of this specification to which reference may best be had for a more complete understanding of the nature and objects of the invention.

In the accompanying drawing forming a part hereof:

Fig. 1 is a view partly in section and partly in elevation of a nut embodying the invention;

Fig. 2 is a section of a nut embodying the invention in slightly different form;

Fig. 3 is a plan view of an insert formed in accordance with one of the aspects of the invention;

Fig. 4 is a more or less diagrammatic sectional view illustrating the formation of an insert in accordance with the principles of the invention; and Fig. 5 is a sectional view showing the principles of the invention, applied to a structure other than a nut.

Referring now to the drawing, there is illustrated in Fig. 1 by way of example but without limitation a section of a self-locking nut embodying the invention. The nut illustrated comprises a body 10 which externally may be of any desired configuration and which in the present instance has been shown as of the ordinary hexagonal shape providing wrench engaging flats, one of which appears at 12. The body 10 is provided with a bore 14 having a thread 16. The thread 16 may be of any desired form depending upon the nature of the bolt with which it is to cooperate. Ordinarily the thread will be of one of the well known standard types. At one end of the bore 14 the body is counterbored to provide a recess or well 18 for the reception of a locking insert 20. The insert 20 is fixed in the nut body against axial or turning movement relative thereto by any desired means and in the present instance it is shown so fixed by means of a flange or lip 22 inturned over the top of the insert after the insert has been placed in the recess or well, it being understood that prior to the assembling operation the lip 22 constituted the axially extending outer end of the wall or rim 24 around the recess.

For applications requiring strength, nuts made of ferrous material such as iron or steel are obviously desirable and in most instances it is desirable to have such nuts made wholly from ferrous material. We have found that satisfactory ferrous inserts can be produced and for this purpose have found that electrolytic iron powder provides a very suitable material, provided that the carbon content is held to a relatively low value if carbon-free material is not employed. The range of carbon content is preferably from 0 to not over 0.20 percent, although higher percentages may in some special instances be employed. When the metal powder is compacted there is a tendency for a thin surface skin to be formed which may be somewhat harder than the remainder of the body of the material and we have found that it is in some instances advantageous to provide on this account a material in the powder to be compacted which will provide a certain amount of lubrication. We have found lead to be satisfactory for this purpose, which may be added to iron powder in amounts up to as high as approximately five percent, although we have found that approximately three percent of lead causes optimum results, that is provides a lubricant effect sufficient to materially reduce the amount of torque required to cause a bolt thread to first impress a thread in the metal, while at the same time not reducing to an undesired degree the holding power of the nut on the bolt. Although the melting point of lead is materially below that of iron, we have found that additions of lead in the amounts above noted do not adversely affect the nature of the material produced by the sintering operation.

We have also discovered that to secure the most satisfactory results, the pressure to which the powder is subjected in compacting it before sintering is important and for ferrous powder of the kind above noted we have found that compacting pressures in the range from between approximately fifty tons per square inch to approximately one hundred and fifty tons per square inch give satisfactory results, with the most advantageous pressure in the neighborhood of one hundred tons per square inch. Compacting and sintering of powdered elastic metal produces a porous product having voids in the mass which voids permit of the compression and displacement of the metal to the extent required to allow a thread to be impressed therein, without involving compressive stresses and forces so high as to injure a bolt thread while at the same time retaining sufficient elastic resistance in the material to provide the required gripping action. If the powder is too loosely compacted, then the extent of the voids is such that the desired elastic strength and gripping action of the material is not obtained, whereas on the other hand if the metal is too solidly compacted the material assumes too closely the character of solid metal produced by fusion processes such as casting and will not permit the impression of a thread without developing forces sufficiently high to injure the bolt thread. Consequently, as above noted, the value of the compacting pressure employed is important to the securing of the most satisfactory results. The precise pressure most advantageously employed may vary with the specific analysis of the material employed but may readily be ascertained by simple experiments in each individual case. However, in most instances it will be found that where pressures under fifty tons are employed the material will be too porous for satisfactory results and with pressures above one hundred and fifty tons the material will be so dense as to injure bolt threads.

Satisfactory locking action is not limited to the use of ferrous powdered metal. We have found that some of the non-ferrous elastic metals such as bronze, brass, copper and even the lighter metals such as the alloys of aluminum also are capable of providing satisfactory locking inserts when powders of such metals are properly compressed and sintered. For example, a brass consisting of copper in the range of from approximately 60% to 80% with the remainder zinc has been found satisfactory, with the copper content most advantageously being in the neighborhood of 70%. Such alloys may also advantageously contain a small quantity of phosphorous, for example, 0.3%. A suitable bronze may contain tin up to approximately 10% with the remainder copper, a tin content of approximately 5% being preferable. In the case of such non-ferrous alloys, substantially the same compacting pressures may be used as for ferrous powders.

Metal powder of an ordinary commercial grade of fineness, as for example powder sold commercially as "100 mesh," is suitable for the purposes of this invention and normal sintering temperatures for the analysis of metal employed may be used, as for example temperatures in the range of from approximately 1700° F. to 1900° F. in the case of a ferrous powder and in the range of approximately 1500° F. to 1650° F. in the case of bronze or brass.

In the case of relatively small nuts the locking insert may advantageously be entirely unthreaded, the bore of the insert being of smaller diameter than the major diameter of the thread in the body of the nut and preferably (although not necessarily) being slightly larger than the minor diameter of the thread. In the case of larger nuts the torque required to apply the nut the first time (when the thread is first impressed) may be undesirably great if the insert has an unthreaded bore engaged by the bolt thread around its entire periphery and in such instances the bore of the insert may be advantageously modified by providing a partial depth thread which nevertheless provides interference with the bolt threads and requires displacement of the material of the insert when the nut is threaded on a bolt. Such a nut is shown in Fig. 2 in which the insert 20a is provided with a partial depth thread 26. In such a construction the thread 26 is in the nature of a continuation of the thread 16 and in phase or substantially in phase with and of the same pitch is the latter thread. To effect this, the insert is assembled in the threaded nut body before the thread 26 is formed and the desired thread is then made by threading through the insert a suitable tool for forming the desired partial thread.

Alternatively, instead of forming a partial depth thread, the bore of the insert may be relieved so that the contact between the bolt threads and the insert is not peripherally continuous. An example of such insert is shown in Fig. 3, the insert 20b in this case having a bore peripherally relieved by a series of notches or scallops, 28. Still other expedients may be employed to provide what is effected by the arrangements specifically described above and what may be termed interference between the bolt thread and the wall of the bore of the insert, by which is meant that the bolt cannot be freely threaded through the insert in the same fashion as if the thread through the entire nut were of uniform and continuous character, but must displace metal of the insert by elastic or plastic displacement, or both, because of the interference between the bolt thread and the wall of the insert bore, whether the latter be unthreaded or threaded.

For holding the insert positively against turning in the nut body the overlying lip may be indented at spaced places as indicated at 30 to provide what may be termed "stakes," impressed in the porous material of the insert. Obviously, other means may be employed for locking the insert in place against rotation, as for example by serrating the wall of the well or by making the well and the outer perimeter of the insert of other non-circular form.

In order to provide practical commercial utility, it is essential that the article be capable of manufacture cheaply by mass production methods and the present invention meets this requirement very effectively. While powdered metal is not as cheap as some other forms of metal, fabrication of inserts therefrom can be effected by known types of machines at high speed and with no waste of material, so that the inserts as such can be produced relatively very cheaply. By way of illustration, there is diagrammatically shown in Fig. 4 a preferred means for forming the inserts. As shown in this figure a die 32 is provided having a bore therethrough in which is located a punch 34 having a pilot 36 adapted to project into a recess 38 in a companion punch 40. The die 32 with punch 34 and pilot 36 inserted therein provides a pocket or well into which a predetermined measured quantity of powdered metal 42 is placed before the punch 40 enters the die, thereafter being compressed between punches 34 and 40. In the case of relatively thin inserts the punch 34 may be stationary during the compacting operation but for relatively thick inserts more uniform compacting will be secured if compression is effected by simultaneous movement of both punches toward each other. After the compacting operation is completed, punch 40 may be backed off and punch 34 moved relative to pilot 36 to strip the insert off the pilot. As will be evident from Fig. 4, the production of any desired peripheral configuration of bore or of the outer surface of an insert is readily obtained by the simple expedient of shaping the cross section of the pilot 36 or the bore in the die 32, or both, to any desired special configuration.

While as previously noted, the invention is particularly applicable for the production of self-locking nuts, it is not limited to such use and by way of example there is shown in Fig. 5 another type of application wherein the desired self-locking action is obtained. In this instance, 44 indicates a body which may for example be a heavy casting resting on a bed 46 and having a flange 48 to which it is desired to secure another body 50. In such case the flange 48 is bored and threaded at 52 and counter-bored at 54 to provide a recess in which an insert 56 is fixed, being held in place by peening the edge of the counter-bore over the top of the insert or by any other suitable expedient. The two parts may then be held together by a suitable bolt or stud 58 passing through the insert and held against loosening due to vibration by the griping action of the insert. Such an arrangement may in many instances be highly useful where for reasons of clearance or other reasons it is undesirable or impossible to make use of a nut.

From the foregoing it would be evident that numerous specific forms and analyses of locking inserts may be used without departing from the invention, the scope of which is to be understood as embracing all that falls within the scope of the appended claims.

What is claimed:

1. A threaded fastening device comprising a body providing a threaded bore portion and a locking insert of porous elastic metal fixed in said body, said insert having an opening located to be traversed by a threaded element threaded through said bore portion and said opening being dimensioned to provide interference between the thread of said element and said insert and to require internal displacement of the material of the insert when traversed by said element.

2. A device as set forth in claim 1 in which said insert comprises compacted and sintered metal powder.

3. A device as set forth in claim 1 in which said insert comprises compacted and sintered ferrous metal powder.

4. A device as set forth in claim 1 in which said insert comprises compacted and sintered ferrous metal powder having a carbon content of not more than 0.20%.

5. A device as set forth in claim 1 in which said insert comprises a sintered metal powder containing not more than approximately 5% of lead.

6. A device as set forth in claim 1 in which said insert comprises compacted and sintered ferrous metal powder having a carbon content of not more than approximately 0.20% and a lead content of approximately 3%.

7. A device as set forth in claim 1 in which said insert comprises compacted and sintered brass powder having a copper content within the range of approximately 60% to 80% and with substantially the remainder zinc.

8. A device as set forth in claim 1 in which said insert comprises compacted and sintered bronze powder having a tin content of not over approximately 10% with substantially the remainder copper.

9. A device as set forth in claim 1 in which the opening in said insert is shaped to have peripherally spaced portions of such radius as to be engaged by said threaded element, said portions being separated by portions of such radius as to provide radial clearance between the latter portions and said threaded element.

10. A self-locking nut comprising a unitary body of solid metal, said body providing external wrench engaging surfaces and having a threaded bore, a recess at one end of said bore forming a continuation thereof and an annular insert located in said recess, said insert being formed of compressed and sintered metal powder and having an unthreaded bore, the diameter of which is less than the major diameter and greater than the minor diameter of the thread in said threaded bore, and a lip or flange constituting an integral part of said body inturned over said insert to hold it against displacement in said recess.

11. A nut as set forth in claim 10 in which the metal powder consists of ferrous metal with a lead content of approximately 3%.

12. The method of making a threaded fastening device which includes the steps of forming a metal body having a bore and a recess or well of larger diameter than that of the bore at one end of the bore, preparing a locking insert having an opening therethrough by compacting and sintering metal powder of an elastic metal and fixing said insert against axial and rotational displacement in said recess with the opening of the insert aligned with said bore.

13. The method as set forth in claim 12 in which the bore in said body is threaded prior to the insertion of said insert in said recess.

14. The method as set forth in claim 12 in which after the insert is fixed in said recess, the assembly is threaded by means of a suitable tool to provide a full depth thread in the bore of said body and a partial depth thread in the opening in said insert constituting a continuation of the full depth thread.

15. The method as set forth in claim 12 in which the powder from which said insert is made is compacted under a compression pressure within the range of from approximately fifty tons per square inch to one hundred and fifty tons per square inch.

16. For use in threaded fastening devices, a locking insert having an opening therethrough and consisting of compacted and sintered powder of an elastic metal.

17. An insert as set forth in claim 16 in which the powder is of ferrous metal.

18. An insert as set forth in claim 16 formed from non-ferrous metal powder, the principal constituent of which is copper.

19. An insert as set forth in claim 16 formed from powder of approximately "100 mesh" commercial fineness compacted under a pressure of within the range of from approximately fifty tons per square inch to one hundred and fifty tons per square inch.

DANIEL C. HUNGERFORD.
JOHN D. SHAW.